United States Patent
Rosenberg

(10) Patent No.: US 7,377,957 B2
(45) Date of Patent: May 27, 2008

(54) METHOD AND CONSTRUCTION OF FILTERS AND PRE-FILTERS FOR EXTENDING THE LIFE CYCLE OF THE FILTER BODIES THEREIN

(75) Inventor: Gideon Rosenberg, 20 Hana Senesh Street, Kiryat Tivon (IL) 36000

(73) Assignees: Gideon Rosenberg, Kiryat Tivon (IL); Innovative Defense Technologies Ltd., Charleston, SC (US)

( * ) Notice: Subject to any disclaimer, the term of this patent is extended or adjusted under 35 U.S.C. 154(b) by 309 days.

(21) Appl. No.: 10/544,926

(22) PCT Filed: Feb. 4, 2004

(86) PCT No.: PCT/IL2004/000107

§ 371 (c)(1),
(2), (4) Date: Aug. 10, 2005

(87) PCT Pub. No.: WO2004/071613

PCT Pub. Date: Aug. 26, 2004

(65) Prior Publication Data

US 2006/0065118 A1    Mar. 30, 2006

Related U.S. Application Data

(60) Provisional application No. 60/446,440, filed on Feb. 12, 2003.

(51) Int. Cl.
*B03C 3/011* (2006.01)

(52) U.S. Cl. .............. 95/63; 95/70; 95/78; 95/80; 95/81; 96/54; 96/55; 96/56; 96/60; 96/75; 96/76; 210/243; 210/748

(58) Field of Classification Search .............. 96/54–60, 96/75–79; 95/78–81, 62, 63, 69, 70; 210/243, 210/748

See application file for complete search history.

(56) References Cited

U.S. PATENT DOCUMENTS

| | | | | |
|---|---|---|---|---|
| 3,770,605 A | * | 11/1973 | McCoy | 204/562 |
| 3,928,158 A | * | 12/1975 | Fritsche et al. | 204/562 |
| 4,038,049 A | | 7/1977 | Melcher et al. | |
| 4,350,590 A | * | 9/1982 | Robinson | 204/661 |
| 4,364,751 A | | 12/1982 | Copley | |
| 4,406,672 A | * | 9/1983 | Berz | 95/68 |
| 4,504,293 A | | 3/1985 | Gillingham et al. | |
| 4,555,252 A | * | 11/1985 | Eckstein | 96/67 |
| 4,623,365 A | * | 11/1986 | Bergman | 96/58 |
| 4,666,599 A | * | 5/1987 | Mihara | 210/243 |
| 4,744,910 A | * | 5/1988 | Bossard | 204/572 |
| 4,941,962 A | | 7/1990 | Inoue | |
| 5,330,559 A | * | 7/1994 | Cheney et al. | 95/63 |

(Continued)

*Primary Examiner*—Richard L Chiesa

(57) ABSTRACT

A method of utilizing a filter having a filter body removing solid particles from a fluid, in order to extend the life cycle of the filter body before cleaning or replacement thereof is required, characterized in applying to the fluid, upstream of the filter body, an AC electrical field of a frequency and intensity to agglomerate solid particles in the fluid reaching the filter body, such as to reduce the number of smaller particles in the fluid tending to clog the filter body. Also described are a plurality of filter constructions for extending the life cycle of the filter body in accordance with the above method.

20 Claims, 3 Drawing Sheets

U.S. PATENT DOCUMENTS

| | | |
|---|---|---|
| 5,593,560 A | 1/1997 | Inoue |
| 5,695,549 A | 12/1997 | Feldman et al. |
| 5,707,428 A | 1/1998 | Feldman et al. |
| 5,797,978 A | 8/1998 | Rosenberg et al. |
| 6,391,097 B1 | 5/2002 | Rosenberg |
| 6,641,646 B2 | 11/2003 | Rosenberg |
| 6,790,259 B2 * | 9/2004 | Rittri et al. ............ 95/78 |
| 6,872,238 B1 * | 3/2005 | Truce .................. 95/29 |

* cited by examiner

METHOD AND CONSTRUCTION OF FILTERS AND PRE-FILTERS FOR EXTENDING THE LIFE CYCLE OF THE FILTER BODIES THEREIN

RELATED PATENT APPLICATION

This application is a National Phase Application of PCT/IL2004/000107 having International Filing Date of 4 Feb. 2004, which claims the benefit of U.S. Provisional Patent Application No. 60/446,440 filed 12 Feb. 2003. The contents of the above Application are all incorporated herein by reference.

FIELD AND BACKGROUND OF THE INVENTION

The present invention relates to filters, and particularly to a method, filter and pre-filter for extending the life cycle of the filter body before cleaning or replacement is required. The invention is particularly useful with respect to filters of fibrous material, such as paper, for removing solid particles from air or other gases, and the invention is therefore described below with respect to such applications.

The term "air filter" as used herein is intended to include filters not only for air, but also for other gases; the term "paper filter" as used herein is intended to include not only folded paper filters but also other kinds of fiber filters; and the term "solid particles" as used herein is intended to include not only dust, but also other micro-bodies such as aerosols.

One of the largest applications for air filters at the present time is for cleaning the air supplied to internal combustion engines and air compressors. Another popular application is for clean rooms wherein High Efficiency Particle Arrestance (HEPA) filters are mostly used. The most common type of air filters is the paper filter, made up of multiple layers of folded paper or other fiber.

A method for cleaning paper filters by air jets directed through the filter in a direction opposed to the normal airflow path was disclosed in Copley U.S. Pat. No. 4,364,751 and Gillingham et al. U.S. Pat. No. 4,504,293. Both used a pulse jetting formed by a system of valves and nozzles. Since dust particles are retained by the fiber mesh quite tightly, the pulse jet cleaning method can not provide sufficient recovery of the filter, and after only a limited number of cleaning cycles at most, the filter must be discarded and replaced with a new one.

U.S. Pat. Nos. 5,797,978 and 6,391,097 disclose a novel air filtration technology based on plastic discs secured in a tight stack. The discs faces are made with a pattern forming small filtering passageways. An electrode metallic layer is embedded in the plastics and is connected to a DC voltage source in order to generate an electrostatic field between the discs. This field acts on the dust particles to divert them from the air stream and to settle them on the faces of the plastic discs. Such a disc structure can sustain pressure load higher than the fiber material and accordingly enables easy cleaning by reverse air impulses. A novel filter system that includes an air impulse generator for cleaning the filter many times is described in U.S. Pat. No. 6,641,646.

However, paper filters are generally disposable; that is when clogged they generally must be discarded and replaced with new ones. Cleaning paper filters by airflow in the opposite direction is generally not so effective when done by air jets and might cause rupture of the filter if exposed to a blast of air impulse. Periodical replacement of disposable air filters is costly and constitutes an ecological burden.

OBJECTS AND BRIEF SUMMARY OF THE PRESENT INVENTION

An object of the present invention is to provide a method of extending the life cycle of a filter in general, and a paper filter in particular, by reducing the tendency of the smaller particles in the fluid being filtered to clog the filter body. Another object of the invention is to provide a novel construction of filter in general, and paper filter in particular, having an extended life cycle so as to require cleaning or replacement at less frequent intervals. The invention can also be utilized as a pre-filter, or as a means for improving the effectiveness of cyclone pre-filters or other inertia particle separators.

A method of operating a filter to remove solid particles from a fluid by passing the fluid through a filter body having an upstream side and a downstream side, characterized in applying to the fluid, solely at the upstream side of the filter body, an AC electrical field of a frequency and intensity to agglomerate solid particles in the fluid before reaching the upstream side of the filter body, such as to reduce the number of small particles in the fluid tending to clog the filter body and thereby to extend the life cycle of the filter body before cleaning or replacement thereof is required.

As will be described more particularly below, the novel concept of the present invention is based on the effect of an alternating electric field on solid particles before entering the passageways between the discs described in U.S. Pat. Nos. 5,797,978 and 6,391,097, or before getting into the fiber thicket zone in paper type filters. This effect was discovered in a lab test when the operation of a disc filter made according to U.S. Pat. No. 5,797,978 was switched from DC voltage to AC voltage. The RMS value of the AC voltage was lower by 20% than the DC voltage. This change resulted with a surprising and unexpected increase of the measured blocking efficiency, from 99.44% to 99.84%. The interpretation of this result is an improvement of 0.4% out of 0.7%, i.e., a dramatic blocking of an additional 57% of the penetrating particles.

Further investigation of this discovery led to the conclusion that the alternating field induces oscillatory motion of the charged dust particles and accordingly enhances the kinetics of colliding with each other. Smaller particles can therefore attach to bigger particles and/or to form agglomerates that can no longer cross the filtration passageways. The clogging rate of paper filters depends on the particle distribution. It is known that the smaller particles increase the clogging rate. This led to the concept of using an alternating electric field as a useful means for increasing the life cycle of paper filters. Subsequent tests in which alternating electric field was generated around a paper filter proved that the increase of the filter's restriction rate was considerably smaller and could accommodate 40% more dust before clogging. Implementation of this method with cyclone pre-filters or other inertia particle separators will evidently improve their effectiveness as resulting from the efficiency test of the disc filter described above.

As will also be described more particularly below, the above method is particularly effective when the filter body is of a fibrous material for removing solid particles from air or other gas.

In some described preferred embodiments, the AC electrical field is applied between a plurality of spaced, electrically-conductive grids at the upstream side of the filter body.

Each grid is made with openings wide enough to allow free inflow to the filter body, and the spacing between the grids is sufficiently large to prevent voltage breakdown therebetween.

In another described preferred embodiment, the AC electrical field is applied between an electrically-conductive housing and one or more electrically-conductive grid spaced from the housing, all located at the upstream side of the filter body. Each grid is made with openings wide enough to allow free inflow to the filter body, and the spacing between each two of the electrically-conductive grids and the housing is sufficiently large to prevent voltage breakdown therebetween.

A still further embodiment is described below wherein the AC electrical field is applied between a plurality of coaxially-spaced electrically-conductive tubes at the upstream side of the filter body.

In the described preferred embodiments, the AC electrical field is preferably of a frequency of preferably 20-200 Hz, and of an intensity of 1-15 kilovolts.

A filter including a filter body having an upstream side and a downstream side for removing solid particles from a fluid, characterized in that said filter includes an AC electrical field generator for generating an AC electrical field solely on the upstream side of the filter body of a frequency and intensity to agglomerate solid particles in the fluid before reaching the upstream side of the filter body, such as to reduce the number of small particles in the fluid tending to clog the filter body.

Further features and advantages of the invention will be apparent from the description below.

BRIEF DESCRIPTION OF THE DRAWINGS

The invention is herein described, by way of example only, with reference to the accompanying drawings, wherein.

It is to be understood that the foregoing drawings, and the description below, are provided primarily for purposes of facilitating understanding the conceptual aspects of the invention and various possible embodiments thereof, including what is presently considered to be a preferred embodiment. In the interest of clarity and brevity, no attempt is made to provide more details than necessary to enable one skilled in the art, using routine skill and design, to understand and practice the described invention. It is to be further understood that the embodiments described are for purposes of example only, and that the invention is capable of being embodied in other forms and applications than described herein.

DESCRIPTION OF PREFERRED EMBODIMENTS

Figure 1:
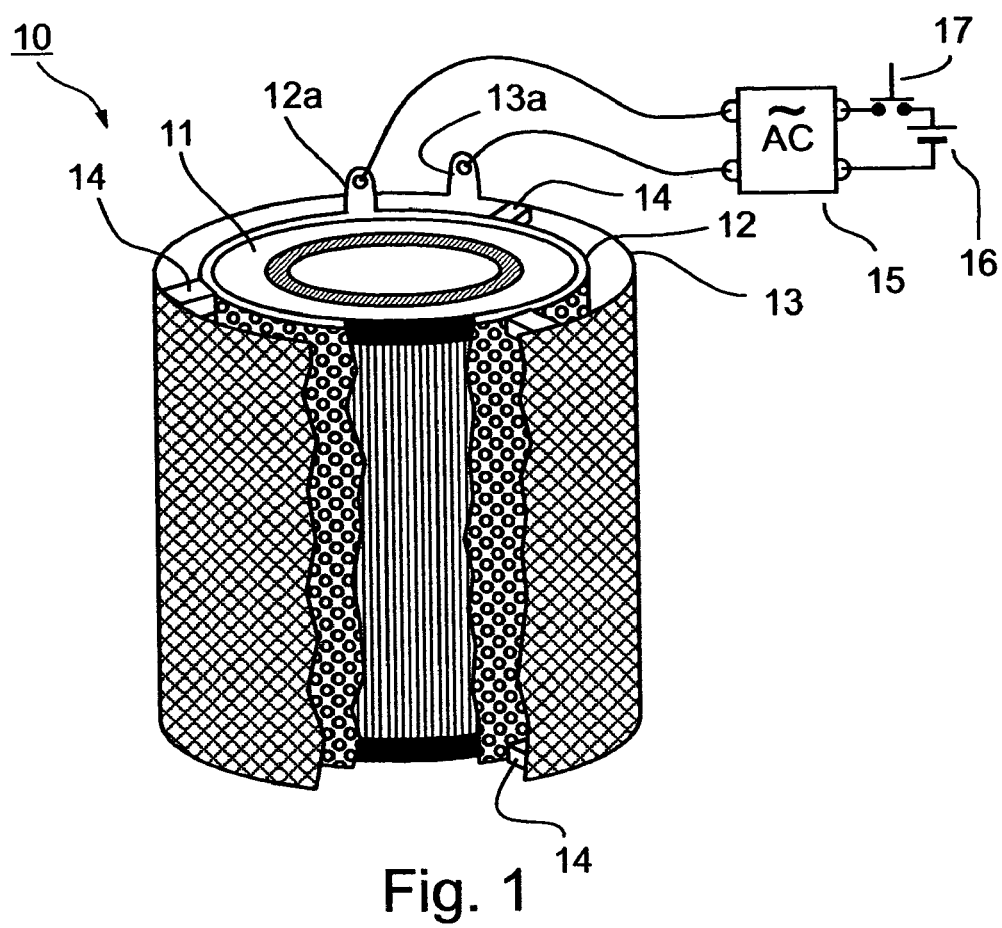
FIG. 1 is a three-dimensional view, partly broken away, illustrating one form of filter constructed in accordance with the present invention.

The filter illustrated in FIG. 1, therein generally designated 10, includes a cylindrical filter body 11 of paper, a first cylindrical grid 12 of electrically-conductive material enclosing the cylindrical filter body 11, and a second electrically-conductive grid 13 of cylindrical configuration enclosing grid 12 but radially spaced therefrom by a plurality of insulating spaces 14. The two electrically-conductive grids 12 and 13 may be of metal braided wire defining a plurality of relatively large openings to permit easy passage therethrough of the fluid being filtered. In the example illustrated in FIG. 1, the fluid being filtered is air moving from the outer surface of the cylindrical paper filter 11 towards its inner surface, such that the outer surface of filter body 11 constitutes its upstream surface, and the inner constitutes its downstream surface. Accordingly, the two grids 12 and 13 are located in spaced relationship to each other at the upstream surface of the paper filter body 11.

Each of the two grids 12, 13, includes a terminal 12a, 13a, respectively, connecting the respective grid to a source of AC voltage 15. In this example, the illustrated filter is used in a vehicle for filtering the air inputted into the engine; accordingly, the AC voltage source 15 is a DC to AC converter powered by the vehicle battery 16 controlled by the ON/OFF switch 17.

During the operation of the filter illustrated in FIG. 1, the two metal grids 12, 13, enclosing the upstream side of filter body 11 and powered by converter 15, generate an AC electrical field of a frequency and intensity to agglomerate particles in the air reaching the filter body 11, such as to reduce the number of smaller particles in the air tending to clog the filter body. By so reducing the number of smaller particles in the air tending to clog the filter body, the life cycle of the filter body is substantially extended before cleaning or replacement is required.

The following tests were performed on a filter constructed in accordance with FIG. 1:

A commercial vehicle filter was used having an initial flow of 200 CFM with a standard fine test dust fed at a rate of 1 gr/min. The AC voltage was supplied by a transformer of output 6600V peak-to-peak at 50 Hz. The gap between the grids 12, 13 was 12 mm. The field intensity accordingly was over 500V/mm. Prediction of the effect of the electric field on the kinetics of the dust particles is based on the following mathematical model.

The electrostatic charges on dust particles are closely proportional to the particle size. For example an 0.5 micron particle carries a charge of 120 e, a 1.0 micron particle carries 250 e and a 1.5 micron particle carries 420 e (where $e=1.6 \times 10^{-19}$ coulomb, is one electron charge). The mass of the particle is however closely proportional to the third power of its size (diameter). The force acting on a charged particle in an electric field is proportional to its charge Q times the field intensity E, where $E=V/d$ with V being the applied voltage, and d being the gap between the electrodes. The acceleration of the particle of mass M is accordingly $a=Q.V/d.M$. By substituting the proper values for a 1 micron particle one can find that for $E/d=500V/mm$ the calculated acceleration is roughly 1500 g. Such a strong acceleration will definitely have a considerable impact on the kinetics of the particles. The calculated free traveling path at a time interval of 5 milliseconds (¼ of the period of the 50 Hz frequency) under such acceleration is roughly 19 cm. Compared with the mean free path of a gas molecules at room temperature and atmospheric pressure, which is less than 1 micron, the above result demonstrates the enormous effect of the alternating electric field on the kinetics of the dust particles.

Figure 2:
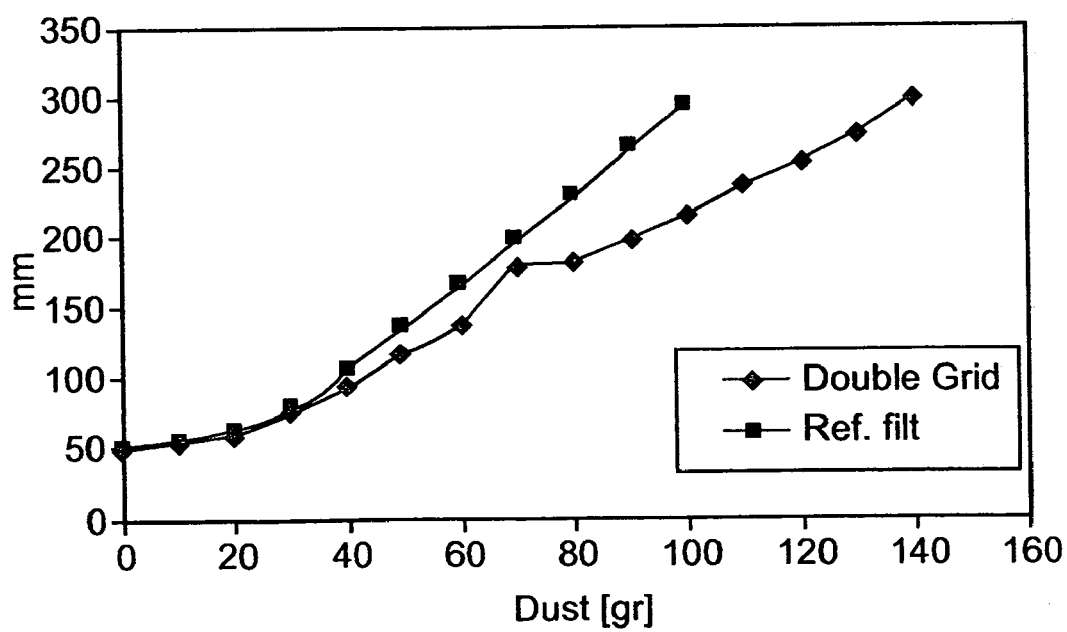
FIG. 2 is a chart comparing the clogging rate of a filter constructed according to FIG. 1 with a filter of conventional construction.

The actual test results are presented in FIG. 2, wherein the filters restriction is plotted versus the amount of dust loaded in the filter. Curve A demonstrates the test data from a reference bare filter body, and curve B for an identical paper filter having a double grid as shown in FIG. 1. A definite reduction of the clogging rate is observed for curve B. Restriction was monitored by manometers scaled to mm of water, where each mm equals 0.1 milibars. The restriction of the reference filter body was increased by 250 mm (water) at 100 grams of dust, whereas it takes 140 grams of dust for the same increase of restriction in the second grid wrapped filter. This represents an improvement of 40%.

It will be appreciated that these test results are provided herein just as an example and that after optimizing design parameters, such as field intensity and frequency, the degree of improvement may be higher than 40%.

Figure 3:
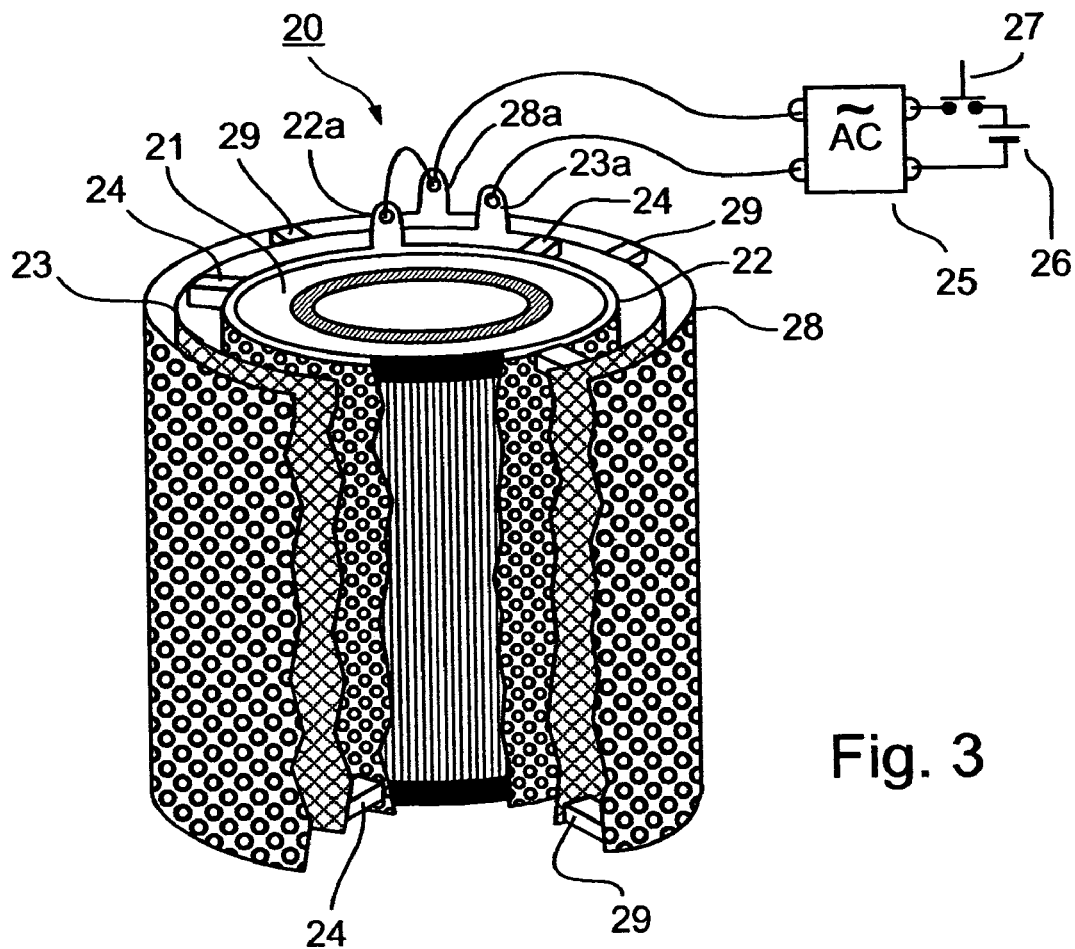
FIGS. 3-6 are fragmentary views illustrating other constructions of filters in accordance with the present invention.

FIG. 3 illustrates a filter, therein generally designated 20, which is of basically the same construction as described above with respect to FIG. 1, but including a third grid of electrically-conductive material for generating the AC electrical field at the upstream side of the filter body. Thus, the filter illustrated in FIG. 3 also includes a cylindrical paper filter body 21 enclosed by a first grid 22, a second grid 23 spaced therefrom by insulators 24, and a third grid 28 spaced by insulators 29 from the second grid 23; and an AC power supply including an converter 25 powered by a battery 26 via ON/OFF switch 27. The structure of elements 21-27 in the filter of FIG. 3 thereby corresponds to the structure of elements 11-17, respectively, in the filter of FIG. 1.

However, as shown in FIG. 3, terminal 22a of the inner grid 22, and terminal 28a of the outer grid 28, are connected together and to one terminal of the AC voltage source 25, whereas terminal 23a of the middle grid 23 is connected to the other terminal of the AC voltage source 25. Accordingly, grids 22 and 23 define one cylindrical chamber in which a first AC electrical field of one phase is generated; whereas grids 23 and 28 define a second cylindrical chamber in which a second AC electric field of opposite phase is generated. The configuration illustrated in FIG. 3 thus creates two successive cylindrical chambers in each of which an AC electrical field is generated to act on the particles within the air in the same manner as described above with respect to FIG. 1, such that the particles in the air flow will be affected by the two electrical fields in series. The described arrangement thus increases the agglomeration of solid particles reaching the upstream side of the filter body 21, such as to further reduce the number of small particles in the air tending to clog the filter body.

It will be appreciated that additional grids could be added in some applications, in order to further increase the agglomerating effect on the dust particles reaching the upstream surface of the filter body.

Figure 4:
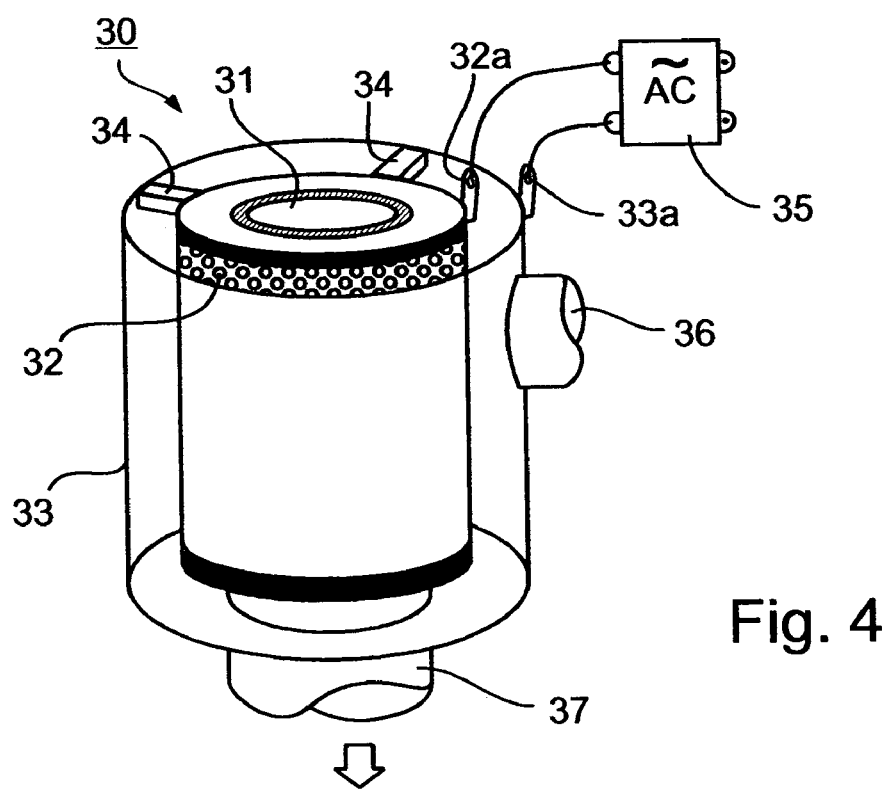

FIG. 4 illustrates a filter construction similar to that of FIG. 1, except that the AC electrical field applied to the fluid upstream of the filter body is generated by a metal canister or housing enclosing the paper filter body, and an electrically-conductive grid between the metal housing and filter body. Thus, the filter illustrated in FIG. 4, and therein generally designated 30, includes a cylindrical filter body 31, a metal grid 32 enclosing the outer surface of the filter body, and an outer metal housing 33 enclosing metal grid 32 and spaced therefrom by a plurality of spacers 34. The metal grid 32 includes a terminal 32a connected to one side of an AC power source 35, and the metal housing 33 is connected via its terminal 33a to the other side of the power supply.

As in the previously described embodiments, the outer surface of filter body 31 is its upstream side, whereas the inner surface is its downstream side. FIG. 4 illustrates an inlet pipe 36 coupled to the metal housing 33 for supplying the fluid (air) to be filtered, and the outlet tube 37 for discharging the filtered air.

The filter illustrated in FIG. 4 is otherwise constructed and operates in the same manner as described above with respect to FIG. 1.

Figure 5:
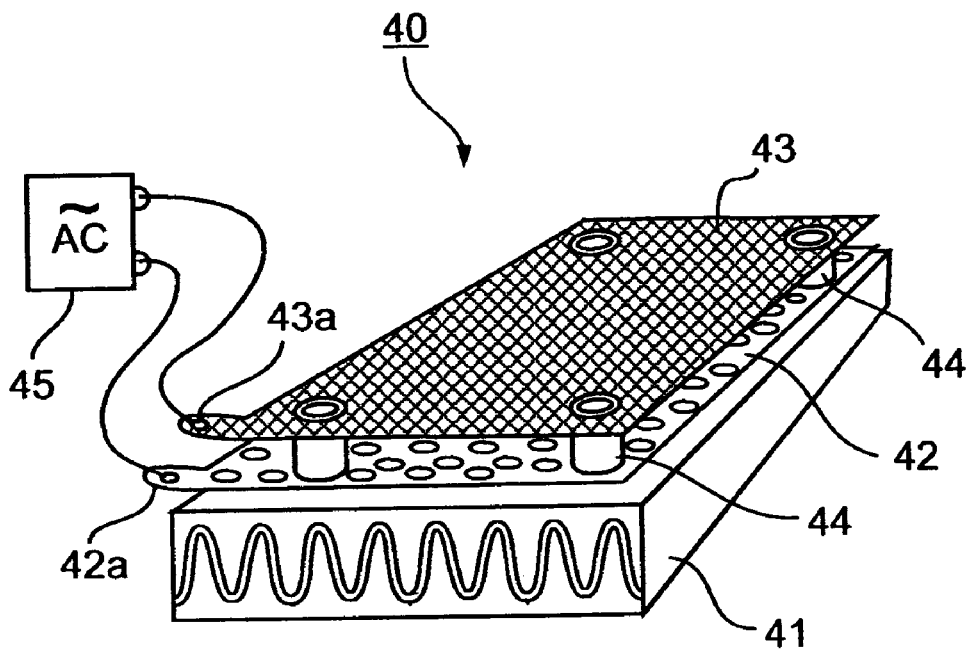

FIG. 5 illustrates a filter, therein generally designated 40, constructed in accordance with the present invention, wherein the filter body 41 is of a flat configuration, rather than of a cylindrical configuration as in the previously described constructions.

A pair of metal grids 42, 43, spaced from each other by insulating spacers 44, are located over one side of the flat filter body 41, constituting the upstream side of the filter body. Grids 42 and 43 include terminals 42a, 43a, connected to an AC power supply 45 for generating an AC electrical field to agglomerate solid particles in the air reaching the filter body 41. In all other respects, the flat filter illustrated in FIG. 5 is constructed and operates in the same manner as described above with respect to FIG. 1.

Figure 6:
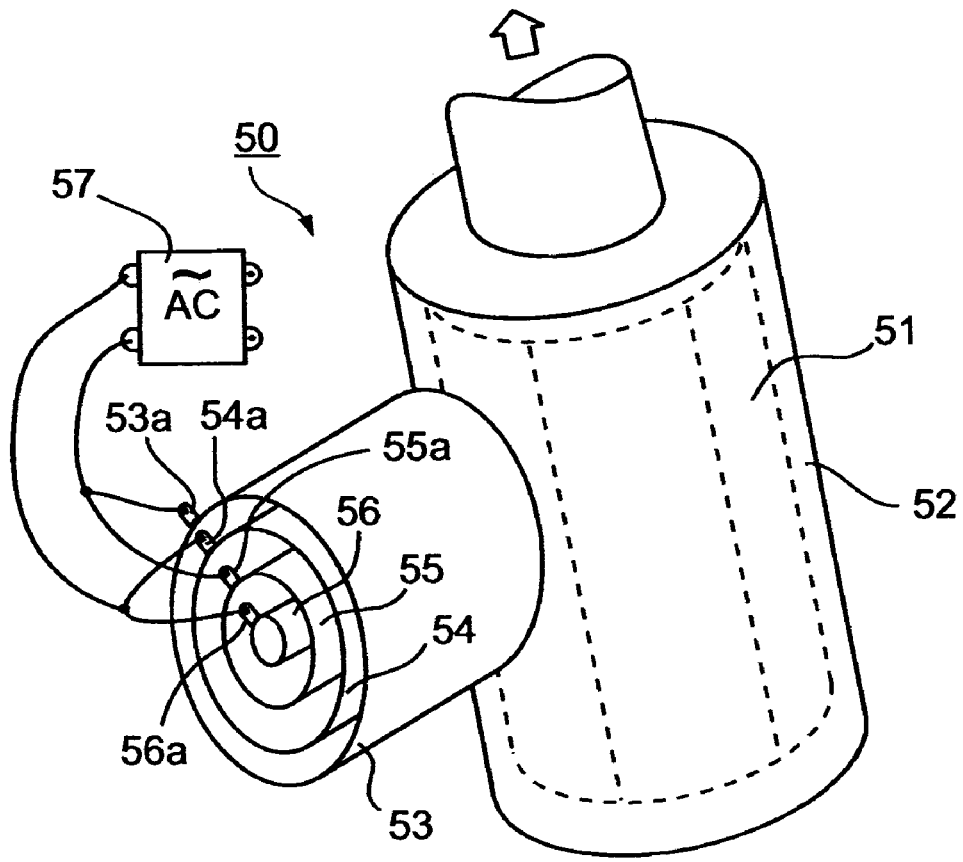

FIG. 6 illustrates a filter wherein the AC electrical field for agglomerating solid particles in the fluid reaching the filter body is generated in the inlet tube to the filter body. Thus, the filter illustrated in FIG. 6, therein generally designated 50, includes a filter body 51 within a separate housing 52, and connected at its upstream side to a metal inlet tube 53 enclosing a plurality of further metal tubular electrodes 54, 55 and 56, coaxial with respect to each other and with respect to the outer metal tube 53. Filter body 51 could be a paper filter, a cyclone pre-filter, or any other filter-type device.

Each of the metal tubular electrodes 53-56 includes an electrical terminal 53a-56a, respectively, connected to an AC power supply 57, with alternate terminals connected to one side of the power supply, and the remaining alternate terminals connected to the opposite side of the power supply. Thus, as seen in FIG. 6, terminals 53a and 55a are connected to one side of power supply 57, and terminals 54a and 56a are connected to the opposite side of the power supply. Such an arrangement thus produces three coaxial cylindrical chambers at the upstream side of filter 51 within housing 52, in each of which chambers is generated an AC electrical field tending to agglomerate the solid particles in the air reaching the filter body 51.

It will be appreciated that many other variations and applications of the invention may be made. Thus, the invention may be embodied in other types of filters, in cyclone pre-filters or other inertia particle separators and pre-filters, and in other types of filters for removing dust and other solid particles from other fluids, such as other gases. The grid and housings described above as being of metal could be made of other electrically-conductive materials, such as electrically-conductive plastics. In addition, the filter body could be of another configuration than cylindrical or flat, and could be of other constructions rather than paper or other fibrous materials. Further, the filter could be equipped with grids or the like for generating a larger number of AC electrical fields at the upstream side of the filter body in order to agglomerate some of the particles in the fluid reaching the filter body. Many other variations, modifications and applications will be apparent.

What is claimed is:

1. A method of operating a filter to remove solid particles from a fluid by passing the fluid through a filter body having an upstream side and a downstream side, characterized in applying to the fluid, solely at the upstream side of the filter body, an AC electrical field of a frequency and intensity to agglomerate solid particles in the fluid before reaching the upstream side of the filter body, such as to reduce the number of small particles in the fluid tending to clog the filter body and thereby to extend the life cycle of the filter body before cleaning or replacement thereof is required.

2. The method according to claim 1, wherein said filter body is of a fibrous material for removing solid particles from air or other gas.

3. The method according to claim 1, wherein said AC electrical field is applied between a plurality of spaced, electrically-conductive grids all at the upstream side of the filter body, the spacing between said grids being sufficiently large to prevent voltage breakdown therebetween.

4. The method according to claim 3, wherein said filter body is of cylindrical configuration, and said plurality of spaced electrically-conductive grids are located coaxially around said cylindrical filter body.

5. The method according to claim 3, wherein said filter body is of a flat configuration, and said plurality of spaced electrically-conductive grids are located on one side of said filter body.

6. The method according to claim 1, wherein said AC electrical field is applied between an electrically-conductive housing and an electrically-conductive grid spaced from said housing, both located at the upstream side of the filter body, the spacing between said electrically-conductive grid and housing being sufficiently large to prevent voltage breakdown there between.

7. The method according to claim 6, wherein; said filter body is of cylindrical configuration; said electrically-conductive housing is of cylindrical configuration enclosing said cylindrical filter body; and said electrically-conductive grid is of cylindrical configuration and is interposed between said housing and said filter body.

8. The method according to claim 1, wherein said AC electrical field is applied between a plurality of coaxially-spaced electrically-conductive tubular electrodes at the upstream side of the filter body.

9. The method according to claim 1, wherein said AC electrical field is of a frequency of 20-200 Hz and an intensity of 1-15 kilovolts.

10. The method according to claim 1, wherein said filter body is of paper for removing solid particles from air.

11. A filter including a filter body having an upstream side and a downstream side for removing solid particles from a fluid, characterized in that said filter includes an AC electrical field generator for generating an AC electrical field solely on the upstream side of the filter body of a frequency and intensity to agglomerate solid particles in the fluid before reaching the upstream side of the filter body, such as to reduce the number of small particles in the fluid tending to clog the filter body.

12. The filter according to claim 11, wherein said filter body is of a fibrous material for removing solid particles from air or other gas.

13. The filter according to claim 11, wherein said AC electrical fields generator includes a plurality of spaced, electrically-conductive grids all at the upstream side of the filter body, the spacing between said grids being sufficiently large to prevent voltage breakdown therebetween.

14. The filter according to claim 13, wherein said filter body is of cylindrical configuration, and said plurality of spaced electrically-conductive grids are located coaxially around said cylindrical filter body.

15. The filter according to claim 13, wherein said filter body is of a flat configuration, and said plurality of spaced electrically-conductive grids are located on one side thereof.

16. The filter according to claim 11, wherein said AC electrical field generator includes an electrically-conductive housing and an electrically-conductive grid spaced from said housing both located at the upstream side of the filter body, the spacing between said electrically-conductive grid and housing being sufficiently large to prevent voltage breakdown therebetween.

17. The filter according to claim 16, wherein: said filter body is of cylindrical configuration; said electrically-conductive housing is of cylindrical configuration enclosing said cylindrical filter body; and said electrically-conductive grid is of cylindrical configuration and is interposed between said housing and said filter body.

18. The filter according to claim 11, wherein said AC electrical field generator includes a plurality of coaxially-spaced electrically-conductive tubular electrodes at the upstream side of the filter body.

19. The filter according to claim 11, wherein said AC electrical field generator generates an electrical field of a frequency of 20-200 Hz and an intensity of 1-15 kilovolts.

20. A pre-filter for use with a filter body removing solid particles from a fluid flowing therethrough from an upstream side to a downstream side of the filter body, said pre-filter comprising an AC electrical field generator configured and dimensioned to be applied solely to the upstream side of the filter body for generating an electrical field of a frequency and intensity to agglomerate solid particles in the fluid before reaching the upstream side of the filter body, such as to reduce the number of small particles in the fluid reaching the upstream side of the filter body and thereby to reduce its clogging rate and to extend its useful life before cleaning or replacement is required.

* * * * *